US010046929B1

(12) United States Patent
Gunnell

(10) Patent No.: US 10,046,929 B1
(45) Date of Patent: Aug. 14, 2018

(54) METHOD FOR LOADING A MEDIA FEEDER TO ACCOMMODATE USERS WITH DISABILITIES

(71) Applicant: Xerox Corporation, Norwalk, CT (US)

(72) Inventor: Reid W. Gunnell, Wilsonville, OR (US)

(73) Assignee: Xerox Corporation, Norwalk, CT (US)

(*) Notice: Subject to any disclaimer, the term of this patent is extended or adjusted under 35 U.S.C. 154(b) by 0 days.

(21) Appl. No.: 15/491,319

(22) Filed: Apr. 19, 2017

(51) Int. Cl.
B65H 1/14 (2006.01)
B41J 13/00 (2006.01)
B41J 13/10 (2006.01)
B65H 7/02 (2006.01)
H04N 1/00 (2006.01)

(52) U.S. Cl.
CPC ............ *B65H 1/14* (2013.01); *B41J 13/0018* (2013.01); *B41J 13/103* (2013.01); *B65H 7/02* (2013.01); *H04N 1/00411* (2013.01); *H04N 1/00604* (2013.01); *B65H 2551/00* (2013.01); *B65H 2801/06* (2013.01); *H04N 2201/0094* (2013.01)

(58) Field of Classification Search
CPC ... B65H 1/04; B65H 1/14; B65H 1/30; B65H 7/20; B65H 2301/152; B65H 2301/363; B65H 2301/421; B65H 2551/00; B65H 2551/18; B41J 13/0018; B41J 13/103; H04N 1/00411; H04N 1/00604; H04N 2201/0094
See application file for complete search history.

(56) References Cited

U.S. PATENT DOCUMENTS

| 5,794,928 | A  | * | 8/1998  | Araseki  | B65H 1/04 271/126 |
| 5,882,005 | A  | * | 3/1999  | Araseki  | B65H 1/04 271/126 |
| 8,613,446 | B2 | * | 12/2013 | Miyake   | B65H 31/10 271/279 |
| 2003/0194254 | A1 | * | 10/2003 | Guddanti | B65H 1/14 400/691 |
| 2010/0320679 | A1 | * | 12/2010 | Miyake   | B65H 31/10 271/298 |

* cited by examiner

*Primary Examiner* — David H Bollinger
(74) *Attorney, Agent, or Firm* — Simpson & Simpson, PLLC

(57) ABSTRACT

A method of loading a media feeder of a printer system including: receiving a first input from a user selecting a first loading preference; storing a first position of the tray in at least one memory element; moving with at least one motor, the tray in a first direction a first distance from the first position to a second position; loading a first quantity of media into the tray; receiving a second input indicating the first quantity of media has been loaded into the tray; and, moving the tray in a second direction, opposite the first direction, until a first sheet of the first quantity of media is in a feeding position for the printer.

12 Claims, 6 Drawing Sheets

METHOD FOR LOADING A MEDIA FEEDER TO ACCOMMODATE USERS WITH DISABILITIES

TECHNICAL FIELD

The presently disclosed embodiments are directed to providing a method for loading a media feeder, more specifically, a method for accommodating users with disabilities for loading paper into a media feeder.

BACKGROUND

Printers and printer systems having media feeders such as a High Capacity Feeder (HCF) are typically arranged with the HCF located in the lowest position possible, i.e., closest to the floor. When the media feeder needs to be filled with printable media, e.g., paper or envelopes, the tray of the HCF lowers itself to the lowest position possible within the HCF and media is loaded in successive quantities from the bottom up. It can be difficult and problematic for those who use a wheelchair, cane or crutches, or who have difficulty bending over far enough to load media into the tray of the HCF at this low of a position without compromising the integrity of the stack of printable media.

SUMMARY

According to aspects illustrated herein, there is provided a method of loading a media feeder of a printer including: receiving a first input from a user selecting a first loading preference; storing a first position of the tray in at least one memory element; moving with at least one motor, the tray in a first direction a first distance from the first position to a second position; loading a first quantity of media into the tray; receiving a second input indicating the first quantity of media has been loaded into the tray; and, moving the tray in a second direction, opposite the first direction, until a first sheet of the first quantity of media is in a feeding position for the printer.

According to aspects illustrated herein, there is provided a method of loading a media feeder of a printer including: receiving a first input from a user selecting a first loading preference; storing a first position of the tray in at least one memory element; moving with at least one motor, the tray in a first direction a first distance from the first position to a second position; loading a first quantity of media into the tray; receiving a second input indicating the first quantity of media has been loaded into the tray; moving the tray in the first direction to a third position a second distance from the second position; loading a second quantity of media into the tray; receiving a third input indicating the second quantity of media has been loaded into the tray; and, moving the tray in a second direction, opposite the first direction, until a first sheet of the second quantity of media is in a feeding position for the printer.

According to aspects illustrated herein, there is provided a media feeder including a tray arranged to hold media, a motor arranged to move the tray in a first direction and a second direction opposite the first direction, a sensor arranged to detect at least one position of the tray, a processor arranged to execute a set of steps, and a memory element arranged to store the set of steps. The set of steps includes: receiving a first input from a user selecting a first loading preference; storing a first position of the tray in the memory element; moving the tray with the motor in the first direction a first distance from the first position to a second position; loading a first quantity of media into the tray; receiving a second input indicating the first quantity of media has been loaded into the tray; and, moving the tray in the second direction until a first sheet of the first quantity of media is in a feeding position.

Other objects, features and advantages of one or more embodiments will be readily appreciable from the following detailed description and from the accompanying drawings and claims.

BRIEF DESCRIPTION OF THE DRAWINGS

Various embodiments are disclosed, by way of example only, with reference to the accompanying drawings in which corresponding reference symbols indicate corresponding parts, in which.

DETAILED DESCRIPTION

Figure 1:
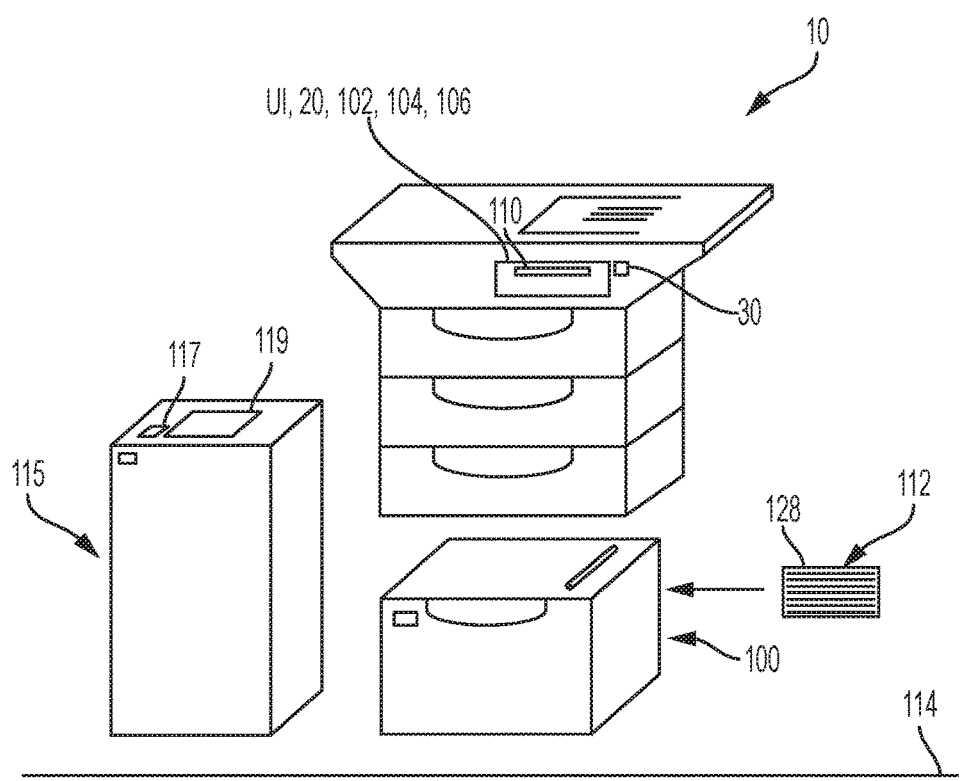
FIG. 1 is a front perspective view of an embodiment of a printer system having an embodiment of a present high capacity feeder therein and an embodiment of a present high capacity feeder adjacent thereto.

At the outset, it should be appreciated that like drawing numbers on different drawing views identify identical, or functionally similar, structural elements of the embodiments set forth herein. Furthermore, it is understood that these embodiments are not limited to the particular methodologies, materials and modifications described and as such may, of course, vary. It is also understood that the terminology used herein is for the purpose of describing particular aspects only, and is not intended to limit the scope of the disclosed embodiments, which are limited only by the appended claims.

Unless defined otherwise, all technical and scientific terms used herein have the same meaning as commonly understood to one of ordinary skill in the art to which these embodiments belong.

Furthermore, the words "printer", "printer system", "printing system", "printer device" and "printing device" as used herein encompasses any apparatus, such as a digital copier, bookmaking machine, facsimile machine, multifunction machine, etc. which performs a print outputting function for any purpose. Additionally, as used herein, "sheet," "sheet of paper", "paper" and "media" refer to, for example, paper, transparencies, parchment, film, fabric, plastic, photo-finishing papers or other coated or non-coated substrate media in the form of a sheet upon which information or markings can be visualized and/or reproduced.

The words "media feeder" as used herein encompasses any automatic media feeder which accepts several sheets of media and feeds one sheet at a time into a printer or copier, allowing the user to print or copy multiple-sheet documents without having to manually feed each sheet during printing. It should be appreciated that "media feeder" includes but is not limited to any High Capacity Feeder (HCF) capable of accepting a quantity of media, e.g., more than one ream of media, and arranged to subsequently deliver the media to a printer one sheet at a time.

The term "User Interface" or "UI", as used herein, encompasses any means of providing communications from or to an end user, including via graphics, text, audio, video, data input, such as voice, typing, touch screen, graphical user interface or other means of input or output to/from any device, including a wireless communication device, or other computing devices. Such UIs may include information and/or actions that are available for viewing, use or interaction with an end user. As used herein, "button" encompasses any physical or tangible button, switch, indicator light, etc., including buttons depicted exclusively on a graphical display, and any non-physical or intangible voice activation, biometric trigger, etc.

The term "motor" as used herein is intended to mean a rotating machine that transforms electrical energy into mechanical energy, e.g., motion. It should be appreciated that "motor" as used throughout this application includes but is not limited to a stepper motor, an alternating current motor, or a direct current motor.

The term "processor" as used herein is used to indicate a central processing unit (CPU) or electronic circuit within a computer configured to carry out the instructions of a computer program. In the discussion that follows, it should be understood that stating that the processor implements an action or that the processor is configured to implement an action is analogous to stating that the processor is configured to execute the computer readable instructions and implement or execute the action. Moreover, the term "computer" is intended to mean an assembly of components, e.g., a processor, memory element, input device, and output device, arranged to receive inputs, produce outputs, store information and algorithms, and execute instructions, and is not intended to be limited to any specific arrangement or group of components.

The term "memory element", as used herein, is intended to mean a device that stores one item of information: if it has q stable states it is said to be q-ary, and if q=2 it is said to be binary. A memory element is usually implemented electronically, sometimes with the assistance of the magnetic, optical, or acoustic properties of a storage medium. In practice, most memory elements are binary. In fast computer circuitry, the flip-flop is the most common type of memory element; however, other memory elements also fall within the scope of the present definition, e.g., random access memory (RAM), a compact disc (CD), and a magnetic disk.

It should be understood that use of "or" in the present application is with respect to a "non-exclusive" arrangement, unless stated otherwise. For example, when saying that "item x is A or B," it is understood that this can mean one of the following: (1) item x is only one or the other of A and B; (2) item x is both A and B. Alternately stated, the word "or" is not used to define an "exclusive or" arrangement. For example, an "exclusive or" arrangement for the statement "item x is A or B" would require that x can be only one of A and B. Furthermore, as used herein, "and/or" is intended to mean a grammatical conjunction used to indicate that one or more of the elements or conditions recited may be included or occur. For example, a device comprising a first element, a second element and/or a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element.

Moreover, although any methods, devices or materials similar or equivalent to those described herein can be used in the practice or testing of these embodiments, some embodiments of methods, devices, and materials are now described.

FIG. 1 depicts an embodiment of a printer system, e.g., printer system 10, including computer 20, button 30, and media feeder 100. Computer 20 comprises User Interface UI, at least one memory element 102, and processor 104. Processor 104 is operatively arranged to execute a set of the computer readable instructions 106, as described in greater detail below. A user may interact with the UI to select loading preference 110. Loading preference 110 implements an embodiment of the steps of the method, described infra, that aids a person with a disability in refilling media feeder 100 with printable media 112. For example, loading preference 110 could indicate a preference to accommodate those with disabilities in conformance with the Americans with Disabilities Act (ADA). It should be appreciated that, media feeder 100 is typically positioned closest to floor 114. When in this position, those users restricted to a wheel chair or who have trouble bending over completely may find it difficult to load printable media 112 into media feeder 100. In some embodiments, printer system 10 may include media feeder 115, in addition to or as an alternative to media feeder 100. Media feeder 115 may have a higher capacity than media feeder 100, or may hold and deliver media of a different type or size than media feeder 100. Moreover, in embodiments including media feeder 115, additional input options may be included on or within media feeder 115, e.g., button 117 or graphic user interface 119. It should be appreciated that buttons 30 and 117 are not limited to any particular type of button but may be any variety of button presently known or later developed.

Figure 2:
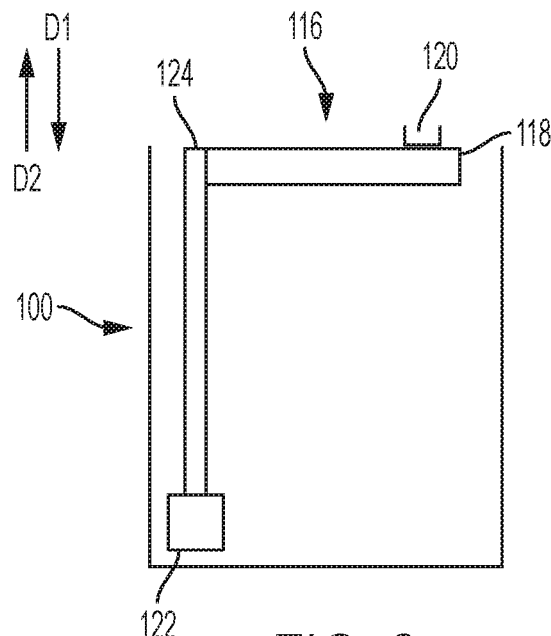
FIG. 2 is a side elevational view an embodiment of present a media feeder in a first position.

FIG. 2 depicts media feeder 100 in first position 116. Media feeder 100 broadly comprises tray 118, sensor 120, motor 122, and track 124. Tray 118 is any substantially flat member operatively arranged to accept printable media 112. Sensor 120 is any device or apparatus that can determine the presence of printable media located on tray 118, e.g., optical sensors, contact sensors, conductivity sensors, etc. Track 124 is operatively connected to motor 122 and tray 118. Motor 122 is operatively arranged to impart motion to track 124, which in turn imparts movement to tray 118 in a first direction D1 or a second direction D2, opposite D1. In the event there is an insufficient quantity printable media within tray 118 for a large job, or there is no printable media within tray 118, a user approaches printer system 10, and utilizes the User Interface UI to introduce a first input by selecting loading preference 110. For example, a first input could include but is not limited to actuation of a button, selection of a menu option, etc. Computer 20 receives a first input and sends instructions to motor 122. Motor 122, in combination with track 124, translates tray 118 in second direction D2 until sensor 120 confirms that a first sheet of printable media 128 is in position to be fed into printer system 10, or that tray 118 is empty and in its highest elevational position. Computer 20 then stores first position 116 in memory element 102. It should be appreciated that, in the alternative to utilizing User Interface UI to generate a first input, a user could utilize button 30 to generate a first input. Moreover, in some circumstances, tray 124 may begin with printable media within tray 124. In such circumstances, after receipt of a first input, computer 20 stores first position 116 in memory element 102 and then proceeds to moving tray 124 in first direction D1 as described below with respect to FIG. 3.

Figure 3:
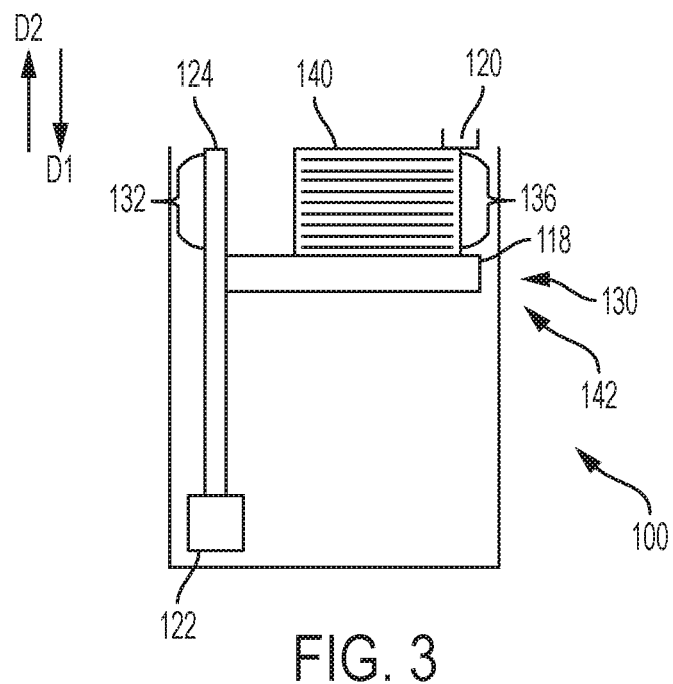
FIG. 3 is a side elevational view an embodiment of present a media feeder in a second position.

FIG. 3 depicts media feeder 100 in second position 130. After computer 20 stores first position 116 in memory, computer 20 executes computer readable instructions 106 to operate motor 122 and track 124 to translate tray 118 in first direction D1, opposite direction D2, first distance 132, coming to rest at second position 130. It should be appreciated that translating tray 118 to second position 130 may also be or alternatively initiated by the user generating an additional input, e.g., via User Interface UI or button 30, authorizing tray 118 to be lowered to second position 130. In some embodiments, first distance 132 is the thickness of first quantity of media 136, or the thickness of a first quantity of media 136 plus an additional distance to ensure tray 118 moves more than the distance required to allow for a particular thickness of printable media to be loaded in tray 118. For example, first quantity of media 136 could be a ream (500 sheets) of paper. In some embodiments where a ream of standard printer paper is about two inches (2") in thickness, first distance 132 could be 2", or it could be 2.1" to ensure a full ream of paper fits in the space provided. It should be appreciated that first distance 132 is not limited to 2.1". For example, first distance 132 could range from two inches (2") to three inches (3") for a full ream of paper, or range from one inch (1") to two inches (2") for a half-ream (250 sheets) of paper. The user can then load the first quantity of media 136 into tray 118. If the user is satisfied that first quantity of media 136 is sufficient for the immediate job, the user can utilize User Interface UI, or button 30, to generate a second input indicating that first quantity of media 136 has been loaded into tray 118 and that the user is ready to use printer system 10. In some embodiments, motor 122 and track 124 then translate tray 118 holding first quantity of media 136 in second direction D2 until first sheet 140 of first quantity of media 136 triggers sensor 120, indicating that tray 118 is now in feeding position 142. In feeding position 142, printer system 10 is operatively arranged to draw or receive first sheet 140 of the first quantity of media 136.

Figure 4:
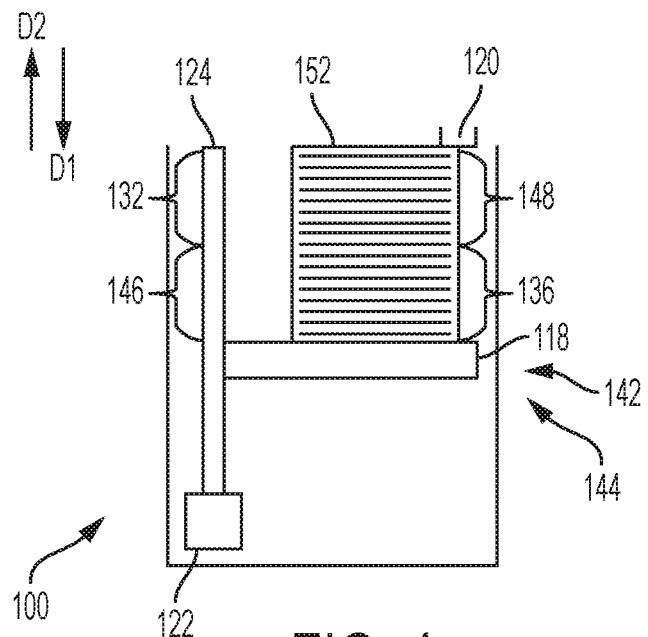
FIG. 4 is a side elevational view an embodiment of present a media feeder in a third position.

FIG. 4 depicts media feeder 100 in third position 144. If a user knows that first quantity of media 136 is insufficient to complete the immediate job, the user can utilize User Interface UI, or button 30, to generate a second input indicating that first quantity of media 136 is insufficient. In embodiments when the user generates a second input indicating that additional printable media is required, motor 122 and track 124 translate tray 118 holding first quantity of media 136 in first direction D1, opposite direction D2, second distance 146 from second position 130 to third position 144. Similar to first distance 132, in some embodiments, second distance 146 could be 2", or it could be 2.1" to ensure a full ream of paper fits in the space provided. It should be appreciated that, second distance 146 is not limited to 2.1". For example, second distance 146 could range from two inches (2") to three inches (3") for a full ream of paper, or range from one inch (1") to two inches (2") for a half-ream (250 sheets) of paper. The user can then load second quantity of media 148 on top of first quantity of media 136. If the user is satisfied that second quantity of media 148 in addition to first quantity of media 136 are sufficient for an immediate job, the user can utilize User Interface UI, or button 30, to generate a third input indicating that second quantity of media 148 has been loaded into tray 118 and that the user is ready to use printer system 10. Motor 122 and track 124 then translate tray 118, holding first quantity of media 136 and second quantity of media 148, in second direction D2 until first sheet 152 of second quantity of media 148 triggers sensor 120, indicating that tray 118 is now in feeding position 142. In feeding position 142, printer system 10 is operatively arranged to draw or receive first sheet 152 of second quantity of media 148.

Figure 5:
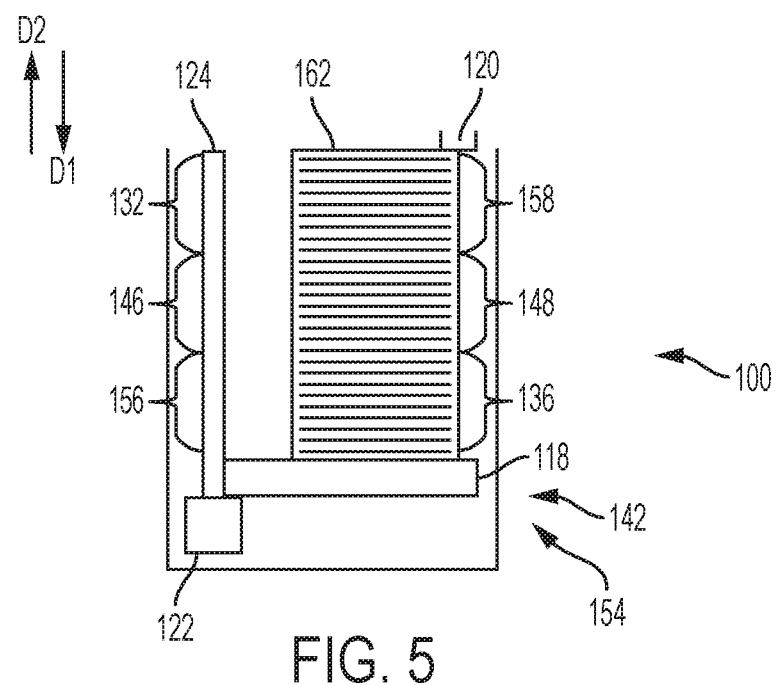
FIG. 5 is a side elevational view an embodiment of present a media feeder in a fourth position.

FIG. 5 depicts media feeder 100 in fourth position 154. If a user knows that first quantity of media 136 and second quantity of media 148 are insufficient to complete the immediate job, the user can utilize User Interface UI, or button 30, to generate a third input indicating that first quantity of media 136 and second quantity of media 148 are insufficient. In embodiments when the user generates a third input indicating that additional printable media is required, motor 122 and track 124 then translate tray 118, holding first quantity of media 136 and second quantity of media 148, in first direction D1, third distance 156 from third position 144 to fourth position 154. In some embodiments, third distance 156 could be 2", or it could be 2.1" to ensure a full ream of paper fits in the space provided. It should be appreciated that third distance 156 is not limited to 2.1". For example, third distance 156 could range from two inches (2") to three inches (3") for a full ream of paper, or range from one inch (1") to two inches (2") for a half-ream (250 sheets) of paper. The user can then load third quantity of media 158 on top of second quantity of media 148. If the user is satisfied that first quantity of media 136, second quantity of media 148, and third quantity of media 158 are sufficient for an immediate job, the user can utilize User Interface UI, or button 30, to generate fourth input 160 indicating that third quantity of media 158 has been loaded into tray 118 and that the user is ready to use printer system 10. Motor 122 and track 124 translate tray 118 holding first quantity of media 136, second quantity of media 148, and third quantity of media 158 in second direction D2 until first sheet 162 of third quantity of media 158 triggers sensor 120, indicating that tray 118 is now in feeding position 142. In feeding position 142, printer system 10 is operatively arranged to draw or receive first sheet 162 of third quantity of media 158.

It should be appreciated that media feeder 115 is arranged to operate in the same fashion as described above with respect to media feeder 100.

It should be further appreciated that the description included above with respect to the various embodiments of the present system and method are not limited to loading one, two or three quantities of media. For example, it is within the scope of the present disclosure to load four or more quantities of media as well.

Figure 6:
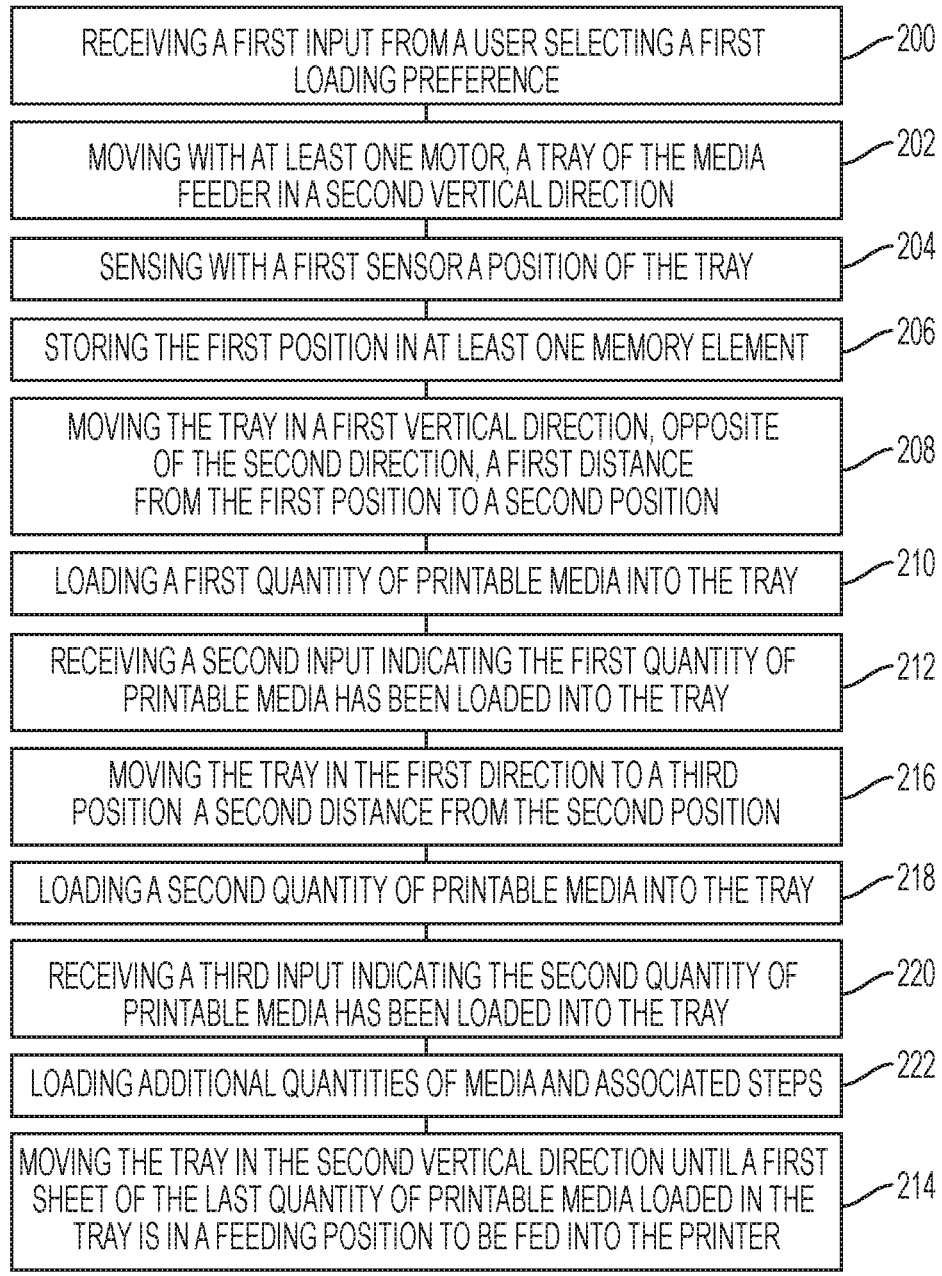
FIG. 6 is a flow chart of an embodiment of steps of a method for loading a media feeder of a printer.

FIG. 6 depicts a flow chart of an embodiment of a method for loading a media feeder, as described in detail above. An embodiment of the present method of loading a media feeder of a printer comprises the following steps. First, a first input is received from a user selecting a first loading preference (Step 200). In embodiments where no printable media is present in a tray of the media feeder upon receipt of the first input, the tray of the media feeder is moved in a second direction (Step 202). In embodiments where printable media is present in the tray of the media feeder upon receipt of the first input, the method proceeds to the next step without executing Step 202. Then, a first position of the tray is sensed with a first sensor (Step 204). Next, the first position is stored in at least one memory element (Step 206). Then, the tray is moved in a first direction, opposite the second direction, to a second position (Step 208). Next, a first quantity of media is loaded into the tray (Step 210). Next, a second input is received from the user authorizing the tray to lower (Step 212). Last, the tray is moved in the second direction until a first sheet of the last quantity of media loaded in the tray is in a feeding position for the printer (Step 214). It should be appreciated that in some embodiments, Steps 202 and 204 are not required, e.g., when a quantity of media is present in the tray before initiating the present method.

In some embodiments, the second input indicates the first quantity of media has been loaded into the tray and initiates movement of the tray to a third position a second distance from the first position (Step 216). Then, a second quantity of media is loaded into the tray (Step 218). Then, a third input is received indicating the second quantity of media has been loaded into the tray (Step 220). It should be appreciated that in some embodiments, Steps 216, 218 and 220 occur between Steps 212 and 214. However, the process may be repeated more than two times during instances when more than two quantities of paper are required, e.g., by repeating Steps 208, 210 and 212 as Step 222 until such time as sufficient quantity of media has been loaded into the media feeder.

Figure 7:
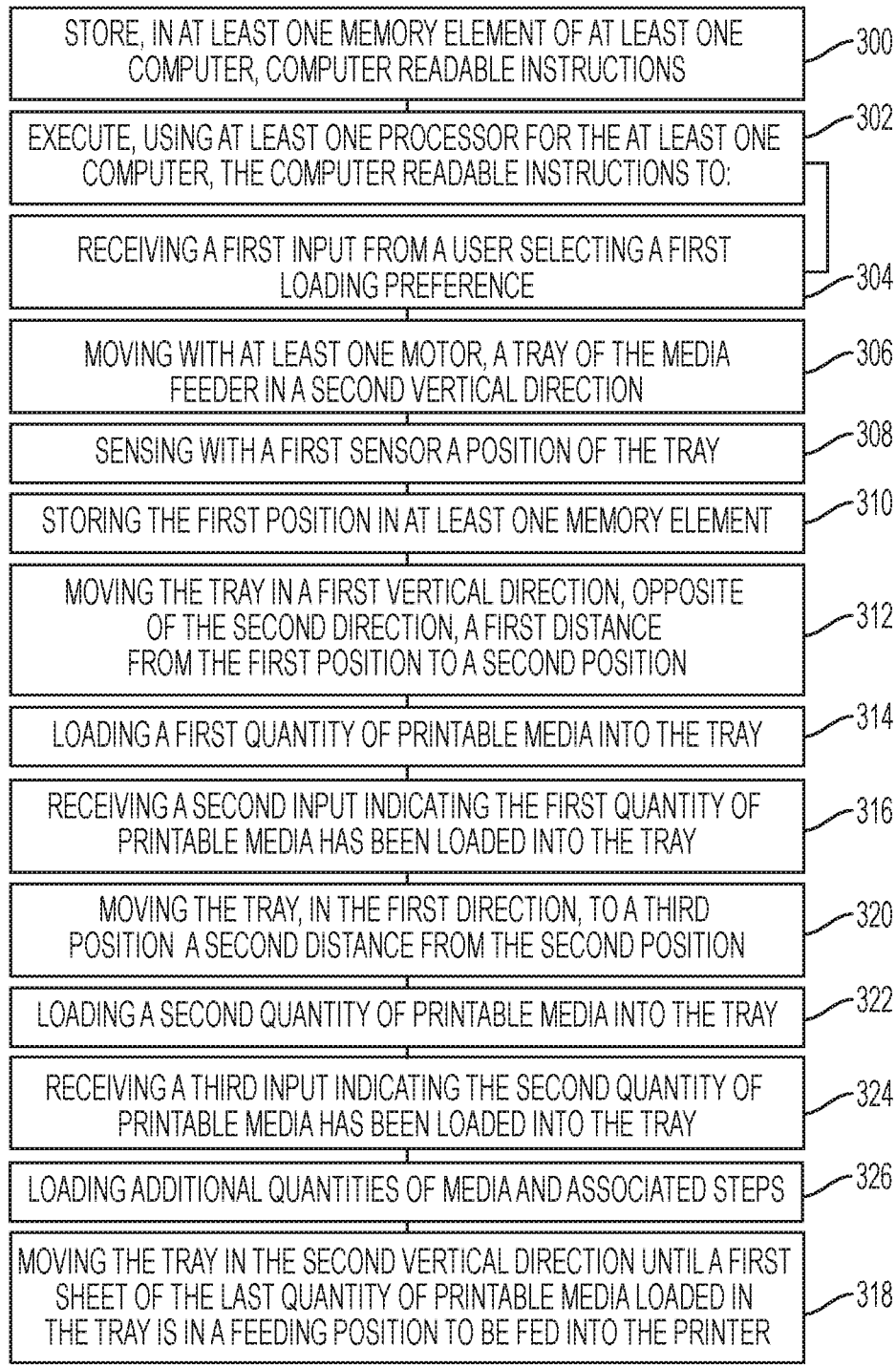
FIG. 7 is a flow chart of an embodiment of steps of a computer based method for loading a media feeder of a printer; and, FIG. 8 is a schematic diagram of an embodiment of a printer system.
Figure 8:
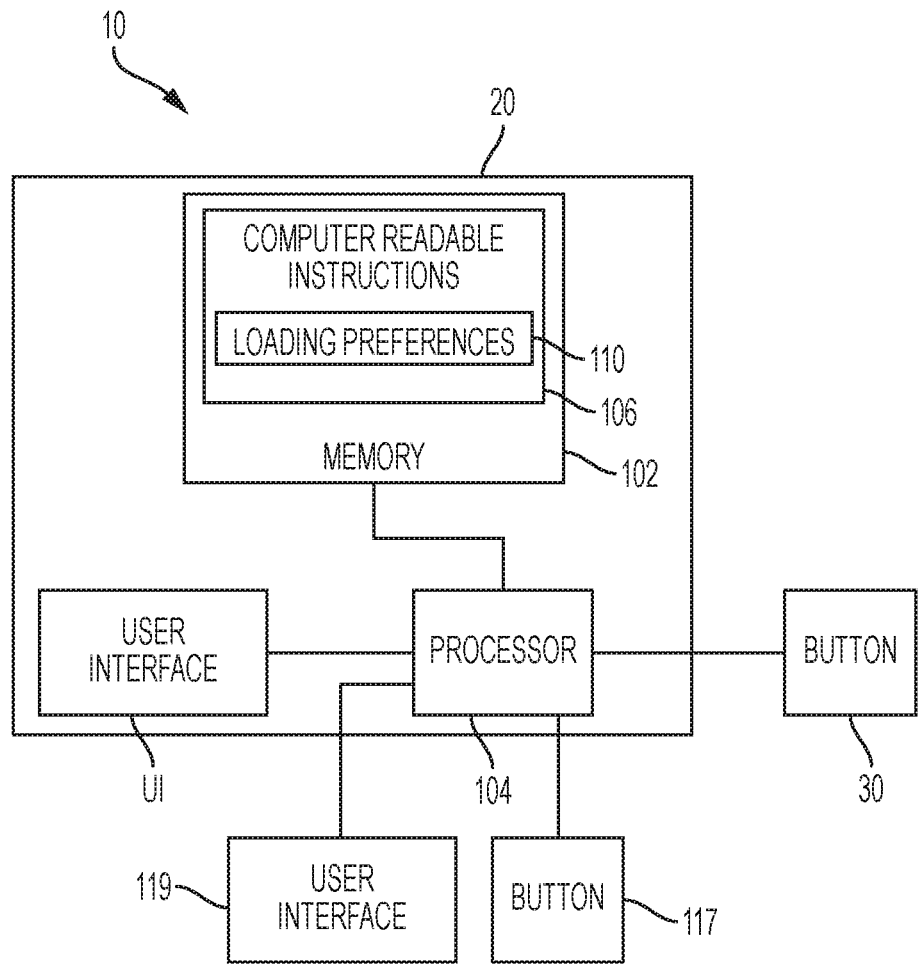

FIG. 7 depicts a flow chart of an embodiment of a computer based method for loading a media feeder implemented by computer 20, as described in detail above. An embodiment of a computer based method for loading a media feeder of a printer comprises the following steps. First, computer readable instructions are stored in at least one memory element of at least one computer (Step 300). Then, the computer readable instructions are executed using at least one processor for the at least one computer (Step 302). The computer readable instructions include the following steps. First, a first input is received from a user selecting a first loading preference (Step 304). In embodiments where no printable media is present in a tray of the media feeder upon receipt of the first input, the tray of the media feeder is moved with at least one motor in a second direction (Step 306). In embodiments where printable media is present in the tray of the media feeder upon receipt of the first input, the method proceeds to the next step without executing Step 306. Next, a first position of the tray is sensed with a first sensor (Step 308). Then, the first position is stored in at least one memory element (Step 310). Next, the tray is moved in a first direction, opposite the second direction, a first distance from the first position to a second position (Step 312). Then, a first quantity of media is loaded into the tray (Step 314). Next, a second input is received indicating the first quantity of media has been loaded into the tray (Step 316). Last, the tray is moved in the second direction until a first sheet of the last quantity of media loaded in the tray is in a feeding position for the printer (Step 318). It should be appreciated that in some embodiments, Steps 306 and 308 are not required, e.g., when a quantity of media is present in the tray before initiating the present method.

In some embodiments, the second input indicates the first quantity of media has been loaded into the tray and initiates movement of the tray to a third position a second distance from the first position (Step 320). Then, a second quantity of media is loaded into the tray (Step 322). Then, a third input is received indicating the second quantity of media has been loaded into the tray (Step 324). It should be appreciated that in some embodiments, Steps 320, 322 and 324 occur between Steps 316 and 318. However, the process may be repeated more than two times during instances when more than two quantities of paper are required, e.g., by repeating Steps 312, 314 and 316 as Step 326 until such time as sufficient quantity of media has been loaded into the media feeder.

In some embodiments, the foregoing system includes a partial or fully mechanical arrangement of components that result in the benefits and capabilities described above. Some mechanical options are capable of moving a tray between positions located at fixed distances relative to each other. For example, a gear of a known size, rotated one revolution, may be used to translate a complementarily engaged shaft. Alternatively, a geneva drive, i.e., a gear mechanism that translates a continuous rotation into an intermittent rotary motion, or some other mechanism for affecting movement of the tray may be used to convert a single revolution of a drive wheel into a partial revolution of a driven wheel, and thereby translation of a shaft engaged with the driven wheel by any means known in the art.

It will be appreciated that various of the above-disclosed and other features and functions, or alternatives thereof, may be desirably combined into many other different systems or applications. Various presently unforeseen or unanticipated alternatives, modifications, variations or improvements therein may be subsequently made by those skilled in the art which are also intended to be encompassed by the following claims.

What is claimed is:

1. A method of loading a media feeder of a printer system comprising:
   receiving a first input from a user selecting a first loading preference;
   storing a first position of the tray in at least one memory element;
   moving with at least one motor, the tray in a first direction a first distance from the first position to a second position;
   loading a first quantity of media into the tray;
   receiving a second input indicating the first quantity of media has been loaded into the tray; and,
   moving the tray in a second direction, opposite the first direction, until a first sheet of the first quantity of media is in a feeding position for the printer.

2. The method of loading a media feeder of a printer system of claim 1, after the step of receiving a first input, further comprising:
   moving with the at least one motor, the tray of the media feeder in the second direction;
   sensing with a first sensor a first position of the tray.

3. The method of loading a media feeder of a printer system of claim 1, wherein the first and second inputs are received from the user via a User Interface (UI) and/or a button.

4. The method of loading a media feeder of a printer system of claim 1 further comprising:
   receiving an additional input to authorize the tray to move from the first position to the second position, wherein the additional input is received via a User Interface (UI) or a button.

5. The method of loading a media feeder of a printer system of claim 1, wherein the at least one motor is a stepper motor, an alternating current motor, or a direct current motor.

6. The method of loading a media feeder of a printer system of claim 1, wherein at least one or more additional quantities of media are loaded by repeating the steps of moving the tray in the first direction, loading an additional quantity of media into the tray and receiving an additional input indicating the additional quantity of media has been loaded into the tray.

7. A method of loading a media feeder of a printer system comprising:

receiving a first input from a user selecting a first loading preference;

storing a first position of the tray in at least one memory element;

moving with at least one motor, the tray in a first direction a first distance from the first position to a second position;

loading a first quantity of media into the tray;

receiving a second input indicating the first quantity of media has been loaded into the tray;

moving the tray in the first direction to a third position a second distance from the second position;

loading a second quantity of media into the tray;

receiving a third input indicating the second quantity of media has been loaded into the tray; and, moving the tray in a second direction, opposite the first direction, until a first sheet of the second quantity of media is in a feeding position for the printer.

8. The method of loading a media feeder of a printer system of claim 7, after the step of receiving a first input, further comprising:

moving with the at least one motor, the tray of the media feeder in the second direction;

sensing with a first sensor a first position of the tray.

9. The method of loading a media feeder of a printer system of claim 7, wherein the first and second inputs are received from the user via a User Interface (UI) and/or a button.

10. The method of loading a media feeder of a printer system of claim 7 further comprising:

receiving an additional input to authorize the tray to move from the first position to the second position, wherein the additional input is received via a User Interface (UI) and/or a button.

11. The method of loading a media feeder of a printer system of claim 7, wherein the at least one motor is a stepper motor, an alternating current motor, or a direct current motor.

12. The method of loading a media feeder of a printer system of claim 7, wherein at least one or more additional quantities of media are loaded by repeating the steps of moving the tray in the first direction, loading an additional quantity of media into the tray and receiving an additional input indicating the additional quantity of media has been loaded into the tray.

* * * * *